(12) United States Patent
Madan et al.

(10) Patent No.: US 12,067,642 B2
(45) Date of Patent: Aug. 20, 2024

(54) MEMORY LATENCY-AWARE GPU ARCHITECTURE

(71) Applicant: ADVANCED MICRO DEVICES, INC., Santa Clara, CA (US)

(72) Inventors: Niti Madan, Santa Clara, CA (US); Michael L. Chu, Santa Clara, CA (US); Ashwin Aji, Santa Clara, CA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 17/030,024

(22) Filed: Sep. 23, 2020

(65) Prior Publication Data

US 2022/0092724 A1 Mar. 24, 2022

(51) Int. Cl.
*G06T 15/00* (2011.01)
*G06F 3/06* (2006.01)
*G06F 9/50* (2006.01)
*G06T 1/20* (2006.01)
*G06T 1/60* (2006.01)

(52) U.S. Cl.
CPC .............. *G06T 1/60* (2013.01); *G06F 3/0604* (2013.01); *G06F 3/0631* (2013.01); *G06F 3/0679* (2013.01); *G06F 9/5016* (2013.01); *G06T 1/20* (2013.01)

(58) Field of Classification Search
CPC ........... G06T 1/20; G06T 15/005; G06T 1/60; G09G 5/363; G06F 3/14
USPC ......................................................... 345/501
See application file for complete search history.

(56) References Cited

U.S. PATENT DOCUMENTS

| 8,010,764 | B2 | 8/2011 | Keller, Jr. et al. | |
|---|---|---|---|---|
| 9,009,384 | B2 | 4/2015 | Nathuji et al. | |
| 9,472,248 | B2 | 10/2016 | Wilkerson et al. | |
| 10,223,260 | B2 | 3/2019 | O'Brien et al. | |
| 2016/0028544 | A1* | 1/2016 | Hyde .................... | H04L 9/0662 711/112 |
| 2017/0262320 | A1* | 9/2017 | Newburn .............. | G06F 9/5038 |
| 2018/0285279 | A1 | 10/2018 | Akin et al. | |
| 2019/0187915 | A1* | 6/2019 | Chinnakkonda Vidyapoornachary ...................... | G06F 3/0685 |

(Continued)

OTHER PUBLICATIONS

International Search Report and Written Opinion dated Dec. 29, 2021 for PCT/US2021/051048, 11 pages.

(Continued)

*Primary Examiner* — Gordon G Liu

(57) ABSTRACT

One or more processing units, such as a graphics processing unit (GPU), execute an application. A resource manager selectively allocates a first memory portion or a second memory portion to the processing units based on memory access characteristics. The first memory portion has a first latency that is lower that a second latency of the second memory portion. In some cases, the memory access characteristics indicate a latency sensitivity. In some cases, hints included in corresponding program code are used to determine the memory access characteristics. The memory access characteristics can also be determined by monitoring memory access requests, measuring a cache miss rate or a row buffer miss rate for the monitored memory access requests, and determining the memory access characteristics based on the cache miss rate or the row buffer miss rate.

20 Claims, 6 Drawing Sheets

(56) References Cited

U.S. PATENT DOCUMENTS

2020/0136906 A1* 4/2020 Guim Bernat .......... H04L 67/10
2021/0192287 A1* 6/2021 Dwivedi ............. G06F 12/0842

OTHER PUBLICATIONS

International Preliminary Report on Patentability issued in Application No. PCT/US2021/051048, dated Apr. 6, 2023, 7 pages.

Meza, J., Chang, J., Yoon, H., Mutlu, O., Ranganathan, P. Enabling Efficient and Scalable Hybrid Memories Using Fine-Granularity DRAM Cache Management. IEEE Computer Architecture Letters 11(2):61-64 · Jul. 2012.

Qureshi, M., Srinivasan, V., Rivers J. "Scalable High-Performance Main Memory System Using Phase-Change Memory Technology" ISCA, 2009, 10 pages.

Meswani et al. "Heterogeneous Memory Architectures: A HW/SW Approach for Mixing Die-stacked and Off-package Memories" IEEE, 2015, 11 pages.

"Micron supports networking and video imaging markets with 288 Mbit RLDRAM II products" EE Times, 2004, <https://www.eetimes.com/micron-supports-networking-and-video-imaging-markets-with-288-mbit-rldram-ii-products/> Accessed Sep. 21, 2023, 3 pages.

Micron. "288Mb: x9, x18, x36 CIO RLDRAM 2 Features", Micon Technologies, Inc., 2015, 82 pages.

Extended European Search Report issued in Application No. 21873250.1, mailed Dec. 21, 2023, 12 pages.

\* cited by examiner

MEMORY LATENCY-AWARE GPU ARCHITECTURE

BACKGROUND

A platform for a conventional processing system includes a central processing unit (CPU), a graphics processing unit (GPU), one or more memory modules (such as dynamic random access memory, or DRAM), and a bus to support communication between these entities. In some cases, the platform is implemented as a monolithic processing architecture such as a system-on-a-chip (SoC). Distributed architectures provide an alternative to the monolithic processing architecture in which physically or logically separated processing units are operated in a coordinated fashion via a high-performance interconnection. One example of a distributed architecture is a chiplet architecture, which captures the advantages of fabricating some portions of a processing system at smaller nodes while allowing other portions to be fabricated at nodes having larger dimensions if the other portions do not benefit from the reduced scales of the smaller nodes. Decreasing the latency of the memory modules used by either monolithic SOC architectures or chiplet architectures improves the performance of applications executing on the processing system. However, lower latency memory modules incur higher costs and may consume additional area. Thus, there is a performance-cost-area trade-off to consider in selecting the type of memory to implement in a processing system.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

Figure 1:
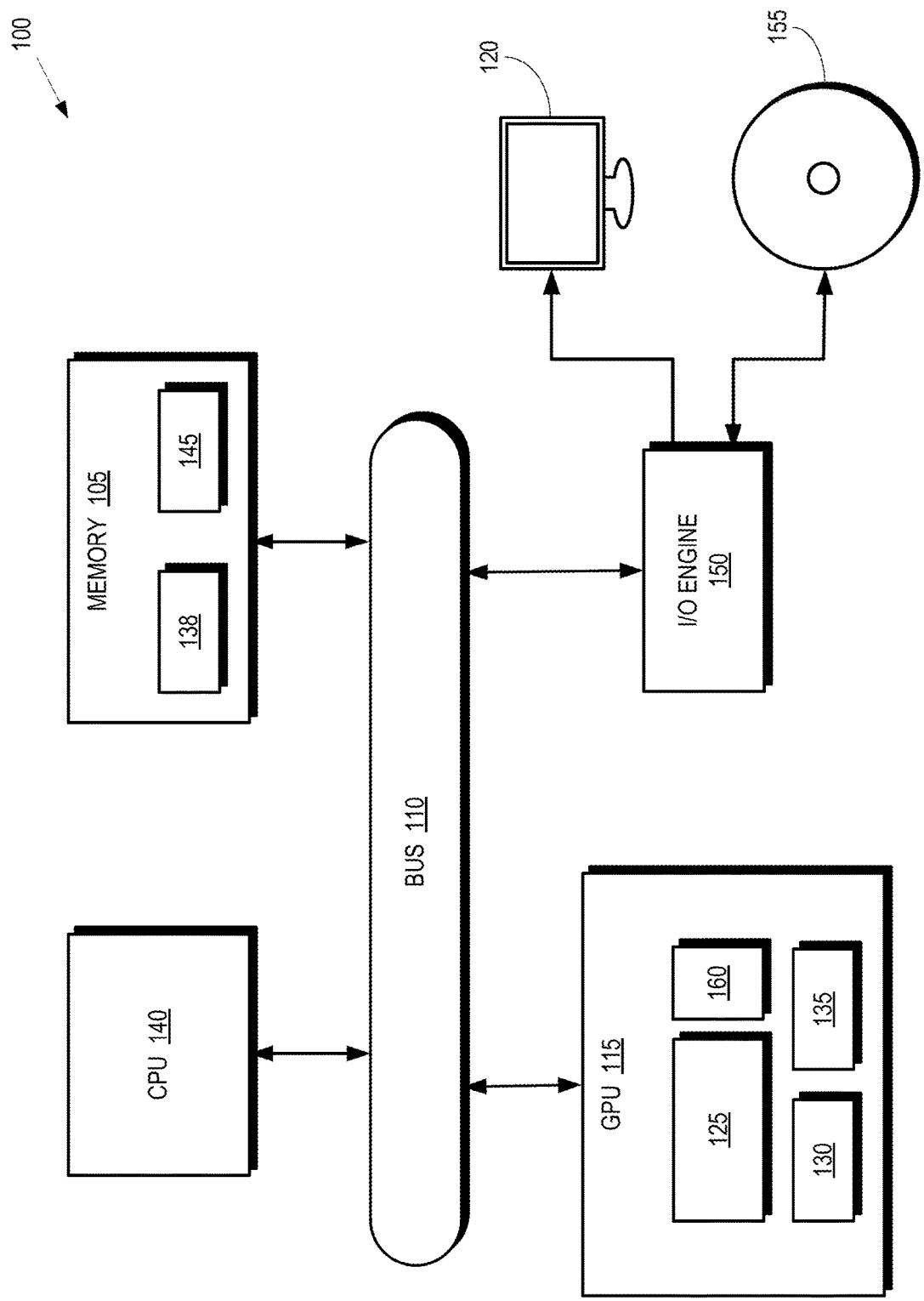
FIG. 1 is a block diagram of a processing system that selectively allocates low-latency memory to applications based on memory access characteristics of the applications according to some embodiments.

Hierarchical heterogeneous memory architectures or hybrid memory architectures attempt to optimize memory latency by using different types of memories for different levels in the memory hierarchy. For example, a first level of the memory hierarchy can be implemented using relatively low-latency dynamic random-access memory (DRAM) and a second level of the memory hierarchy can be implemented using relatively high latency nonvolatile RAM (NVRAM). A hierarchical memory architecture allocates the faster DRAM in the first level to store more frequently accessed memory data or hot pages. Data that is accessed less frequently is stored in the slower and larger NVRAM in the second level. The DRAM therefore functions in a manner analogous to a cache for the NVRAM and data is allocated to the DRAM based on access characteristics associated with the memory location that stores the data. Similar approaches combine die-stacked DRAM with off-package DRAM in the same physical address space. One or more software layers are implemented to manage access to the two levels of DRAM based on characteristics of memory accesses to the memory locations.

Low-latency memory provides different performance advantages to different types of applications executing on the processing system. Applications that generate memory access requests having a high degree of locality do not derive a significant benefit from low-latency memory because the regularity of the memory access patterns increases the cache hit rate which in turn reduces the need to access memory. In addition, this improves the accuracy of algorithms that prefetch data from the memory into a cache hierarchy. Thus, a large percentage of the memory access requests are served from the cache hierarchy and there are relatively few cache misses that require accessing data directly from the memory. In contrast, low-latency memory provides a significant performance enhancement to applications that have irregular memory access patterns that make them difficult to prefetch. Low-latency memory also provides a significant performance enhancement to applications that do not generate memory access requests that exhibit a high degree of locality. These applications have relatively high numbers of cache misses that require accessing the data directly from the memory and benefit from the low row cycle time of the low-latency memories. The performance-cost-area trade-off for implementing low-latency memory or standard memory in a processing system therefore depends on the characteristics of the applications that are executing on the processing system.

FIGS. 1-6 disclose embodiments of an architecture that combines performance benefits of low-latency memory with the cost and area benefits of standard latency memory (e.g., relatively high compared to the low-latency memory) in a processing system that implements a heterogeneous memory including memories having different latency properties. In some embodiments, a first memory portion provides a first latency that is lower than a second latency provided by a second memory portion in the heterogeneous memory. A resource manager selectively allocates memory in the first memory portion or the second memory portion to applications based on memory access characteristics of the applications. Memory in the first memory portion is allocated to applications that generate memory access requests having a low degree of locality or irregular memory access patterns. Memory in the second memory portion is allocated to applications that generate memory access requests having a relatively high degree of locality. In some embodiments, the irregularity of memory access requests from an application is determined based on hints included in the program code for the application. In some embodiments, the resource manager monitors memory access requests from applications and measures statistics such as cache miss rate for the monitored memory access requests. The resource manager then allocates (or reallocates) memory from the first memory portion or the second memory portion based on the statistics. In some embodiments, the processing system is implemented as a monolithic processing unit including heterogeneous memory chips or stacks that include at least one low-latency memory chip or stack. In some embodiments, the processing system is implemented in a distributed architecture such as a chiplet-based design. A first subset of the chiplets include low-latency memory and a second subset of the chiplets include standard latency memory.

FIG. 1 is a block diagram of a processing system 100 that selectively allocates low-latency memory to applications based on memory access characteristics of the applications according to some embodiments. The processing system 100 includes or has access to a memory 105 or other storage component that is implemented using a non-transitory computer readable medium such as a dynamic random access memory (DRAM), static random access memory (SRAM), nonvolatile RAM, and the like. The processing system 100 also includes a bus 110 to support communication between entities implemented in the processing system 100, such as the memory 105. Some embodiments of the processing system 100 include other buses, bridges, switches, routers, and the like, which are not shown in FIG. 1 in the interest of clarity.

The processing system 100 includes at least one graphics processing unit (GPU) 115 that renders images for presentation on a display 120. For example, the GPU 115 renders objects to produce values of pixels that are provided to the display 120, which uses the pixel values to display an image that represents the rendered objects. Some embodiments of the GPU 115 are used to implement DL operations including CNNs, DNNs, and RNNs, as well as performing other general-purpose computing tasks. In the illustrated embodiment, the GPU 115 includes an array 125 of compute units or processor cores that execute instructions for an application concurrently or in parallel. The GPU 115 also includes (or has access to) memory modules that include a first memory portion 130 that has a first latency and a second memory portion 135 that has a second latency that is longer (e.g., has an increased duration) relative to the first latency. In the illustrated embodiment, the GPU 115 also communicates with the memory 105 over the bus 110. However, some embodiments of the GPU 115 communicate with the memory 105 over a direct connection or via other buses, bridges, switches, routers, and the like. The GPU 115 executes instructions such as program code 138 stored in the memory 105 and the GPU 115 stores information in the memory 105 such as the results of the executed instructions.

The processing system 100 also includes at least one central processing unit (CPU) 140 that implements one or more processor cores (not shown in FIG. 1 in the interest of clarity) that execute instructions concurrently or in parallel. The CPU 140 is connected to the bus 110 and therefore communicates with the GPU 115 and the memory 105 via the bus 110. The CPU 140 executes instructions such as program code 145 stored in the memory 105 and the CPU 140 stores information in the memory 105 such as the results of the executed instructions. The CPU 140 is also able to initiate graphics processing by issuing draw calls to the GPU 115.

An input/output (I/O) engine 150 handles input or output operations associated with the display 120, as well as other elements of the processing system 100 such as keyboards, mice, printers, external disks, and the like. The I/O engine 150 is coupled to the bus 110 so that the I/O engine 150 communicates with the memory 105, the GPU 115, or the CPU 140. In the illustrated embodiment, the I/O engine 150 reads information stored on an external storage component 155, which is implemented using a non-transitory computer readable medium such as a compact disk (CD), a digital video disc (DVD), and the like. The I/O engine 150 also writes information to the external storage component 155, such as the results of processing by the GPU 115 or the CPU 140.

Memory modules can be implemented with low-latency memories to help improve performance of applications executing on the GPU 115. However, low-latency memories incur higher area overheads and higher cost. The benefits of low-latency memories are not significant for all applications because of the use of a cache hierarchy, intelligent prefetching, and an optimized memory subsystem can limit memory accesses by keeping the data within chip that is used to implement the GPU 115. On the other hand, some applications, such as those that exhibit irregular memory accesses and do not exhibit row-buffer locality, can experience significant benefits as memory latency is reduced. Memory latency aware GPU architectures combine the advantages of conventional memories and low-latency memories by scheduling latency-sensitive applications to execute using low-latency memory and scheduling applications that are less sensitive to latency on conventional memories.

The GPU 115 implements a resource manager 160 that selectively allocates the first memory portion 130 or the second memory portion 135 to applications based on memory access characteristics. For example, the resource manager 160 can selectively allocate the first memory portion 130 or the second memory portion 135 based on memory access characteristics of the applications executing on the array 125 of processing units in the GPU 115. For another example, the resource manager 160 can selectively allocate the first memory portion 130 or the second memory portion 135 based on memory access characteristics of a kernel executing on the GPU 115. In some cases, the memory access characteristics indicate a latency sensitivity of the application for the kernel. Hints included in the program code (e.g., the program code 138 stored in the memory 105) for the application or the kernel can be used to determine the memory access characteristics. The memory access characteristics can also be determined by monitoring memory access requests from the application or the kernel, measuring a cache miss rate or a row buffer miss rate for the monitored memory access requests, and determining the memory access characteristics based on the cache miss rate or the row buffer miss rate.

Some embodiments of the GPU 115 are implemented as a monolithic system-on-a-chip (SOC) that includes heterogeneous memory chips or memory stacks. A first subset of the memory chips or stacks are used to implement the first memory portion 130 and a second subset of the memory chips or stacks are used to implement the second memory portion 135. Other embodiments of the GPU 115 are implemented using a chiplet-based GPU design that includes a set of chiplets that implement processing units to execute the application and corresponding coprocessors to implement instances of the resource manager 160. A first subset of the chiplets includes the first memory portion 130 and a second subset of the chiplets includes the second memory portion 135.

Figure 2:
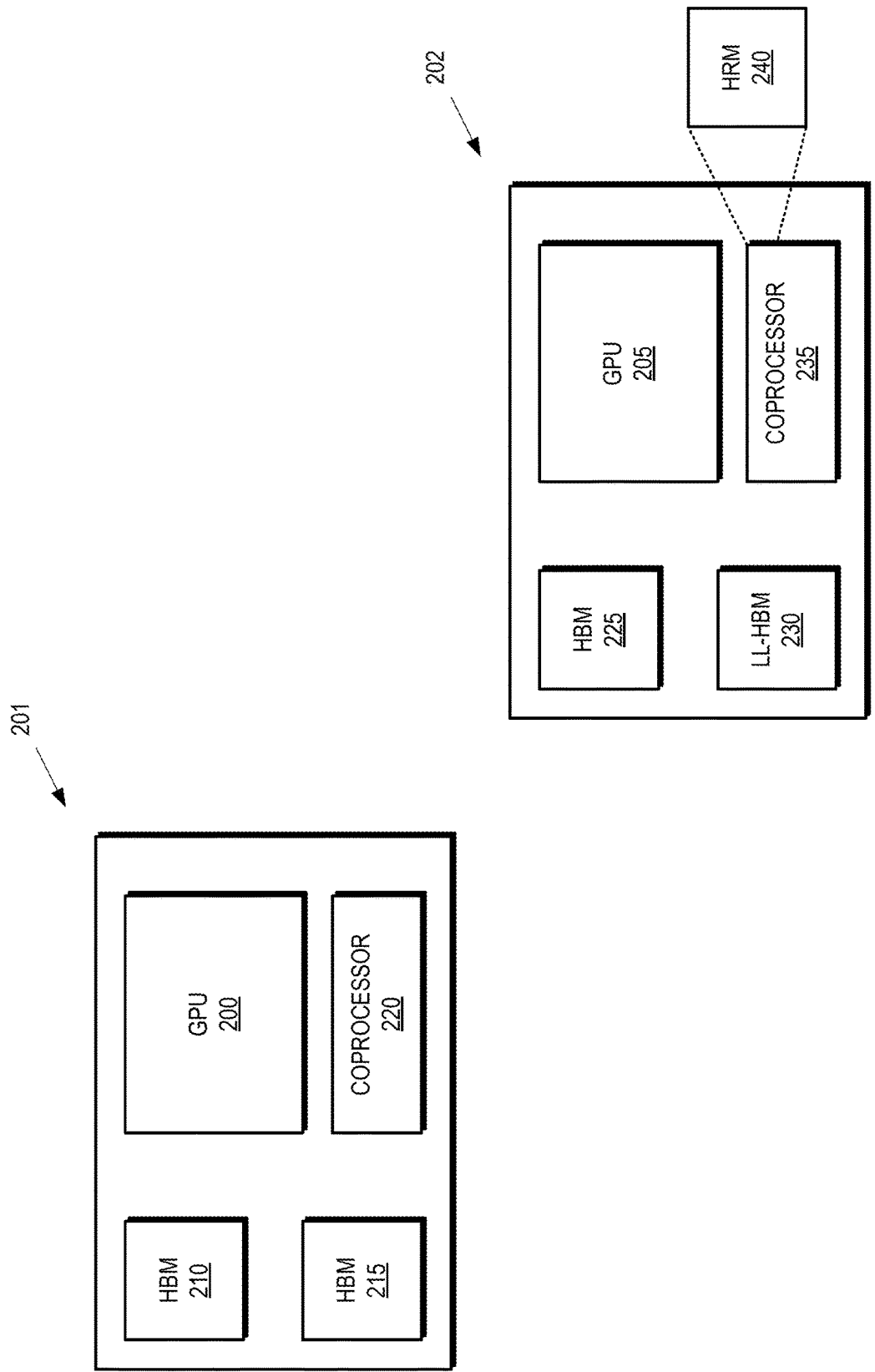
FIG. 2 is a block diagram of a conventional graphics processing unit (GPU) implemented on a monolithic system-on-a-chip (SOC) and a monolithic SOC that includes a GPU that includes heterogeneous memory chips or memory stacks according to some embodiments.

FIG. 2 is a block diagram of a conventional GPU 200 implemented on a monolithic SOC 201 and a monolithic SOC 202 that includes a GPU 205 that includes heterogeneous memory chips or memory stacks according to some embodiments. The SOC 202 including the GPU 205 is used to implement some embodiments of the GPU 115 shown in FIG. 1. The conventional SOC 201 also includes memory modules such as the high bandwidth memory (HBM) modules 210, 215. In some embodiments, the HBM modules 210, 215 are implemented as a three-dimensional (3D) circuit that stacks multiple memory dies such as dynamic random access memory (DRAM) dies. The HBM modules 210 can also include a base die with a memory controller that is interconnected with the stacked memory dies using through-silicon vias and microbumps. Memory in the HBM modules 210, 215 exhibits a first latency, which is defined herein as a time required to perform a memory access operation such as reading a value in a memory cell or writing a value to the memory cell. The conventional SOC 201 further includes a coprocessor 220 that supplements the functionality of the GPU 205, e.g., by offloading processor-intensive tasks such as floating-point arithmetic, signal processing, string processing, cryptography, I/O interfacing, and the like.

The SOC 202 that implements the GPU 205 also includes heterogeneous memory modules having different latencies. In the illustrated embodiment, the SOC 202 includes an HBM module 225 that has a standard latency and a low-latency HBM (LL-HBM) module 230 that has a latency that is lower than the standard latency. The SOC 202 further includes a coprocessor 235 that supplements the functionality of the GPU 205. In the illustrated embodiment, the coprocessor 235 executes instances of a heterogeneous resource manager (HRM) 240, although some embodiments of the SOC 202 implement the HRM 240 as a separate module such as an application-specific integrated circuit (ASIC), a field programmable gate array (FPGA), and the like. The HRM 240 selectively allocates portions of the HBM 225 and the LL-HBM 230 to applications executing on the GPU 205 based on memory access characteristics, such as memory access characteristics of a kernel or applications running on the GPU 205. In some embodiments, the HRM 240 determines the memory access characteristics for the kernel or application based on hints included in the corresponding program code. In some embodiments, the HRM 240 determines the memory access characteristics by monitoring memory access requests to the HBM 225 or the LL-HBM 230, as discussed herein.

Figure 3:
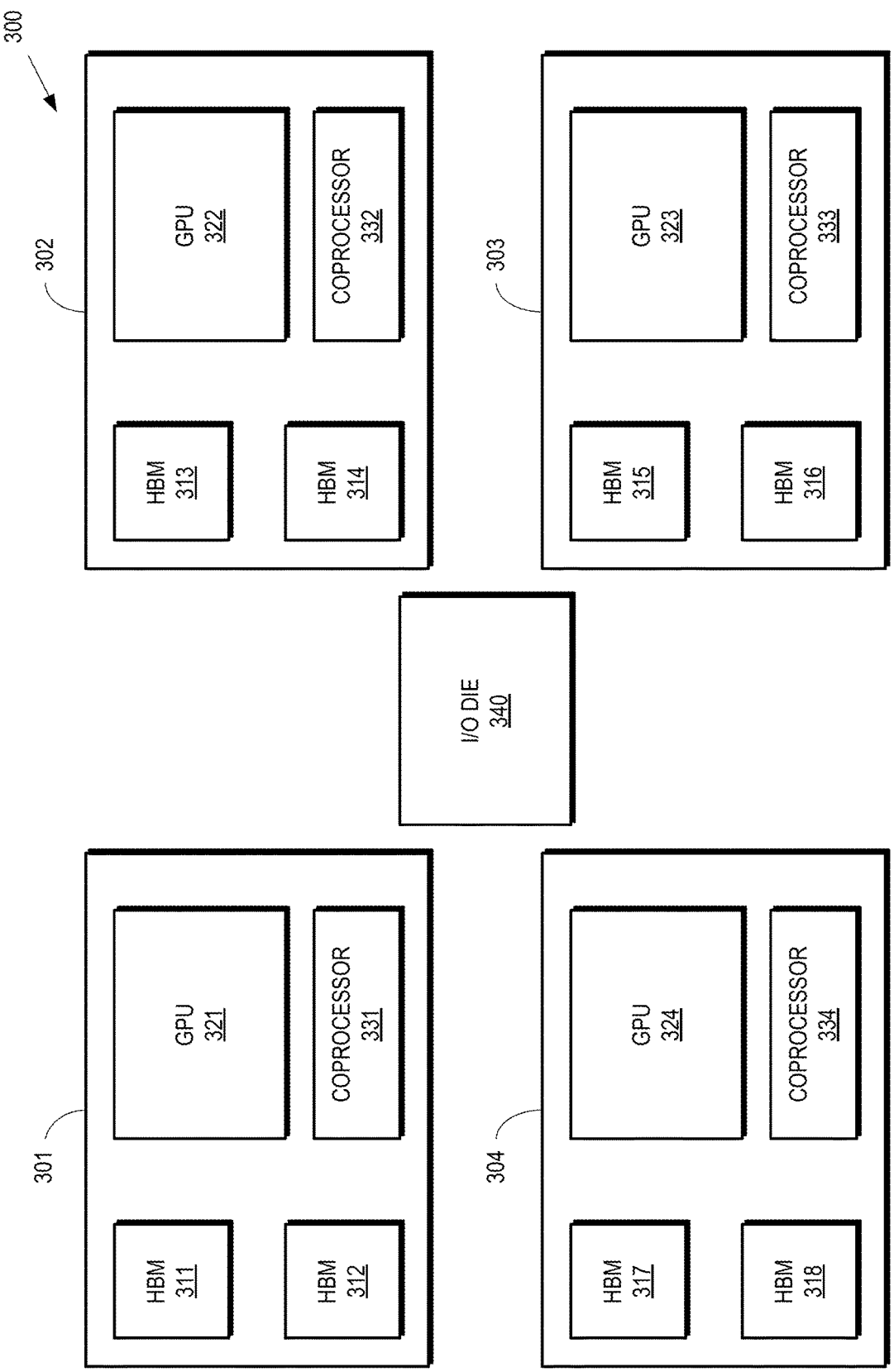
FIG. 3 is a block diagram of a conventional GPU chiplet architecture that includes one or more GPU chiplets.

FIG. 3 is a block diagram of a conventional GPU chiplet architecture 300 that includes one or more GPU chiplets, such as the GPU chiplets 301, 302, 303, 304, which are collectively referred to herein as "the GPU chiplets 301-304." As used herein, the term "chiplet" refers to any device having the following characteristics: 1) a chiplet includes an active silicon die containing at least a portion of the computational logic used to solve a full problem (i.e., the computational workload is distributed across multiples of these active silicon dies); 2) chiplets are formed on the same substrate and packaged together as a monolithic unit; and 3) the programming model preserves the concept that the combination of these separate computational dies (i.e., the GPU chiplets 301-304) are a single monolithic unit. Thus, the GPU chiplets 301-304 are not exposed as separate devices to an application that uses the GPU chiplets 301-304 for processing computational workloads. Although four GPU chiplets 301-304 are shown in FIG. 3, the number of GPU chiplets in the GPU chiplet architecture 300 is a matter of design choice and varies in other embodiments.

The GPU chiplets 301-304 include corresponding memory modules such as the HBM 311, 312, 313, 314, 315, 316, 317, 318, which are collectively referred to herein as "the HBM 311-318." In the illustrated embodiment, the HBM 311-318 operate with a first memory access latency. The GPU chiplets 301-304 also include corresponding GPUs 321, 322, 323, 324 (collectively referred to herein as "the GPUs 321-324") and coprocessors 331, 332, 333, 334 (collectively referred to herein as "the coprocessors 331-334"). An I/O die 340 coordinates providing information to the GPU chiplets 301-304, conveying information from the GPU chiplets 301-304 to other entities such as the CPU 140 shown in FIG. 1, and exchanging information between the GPU chiplets 301-304. In the interest of clarity, the numerous interconnections between the I/O die 340, the GPU chiplets 301-304, and external entities, are not shown in FIG. 3.

Figure 4:
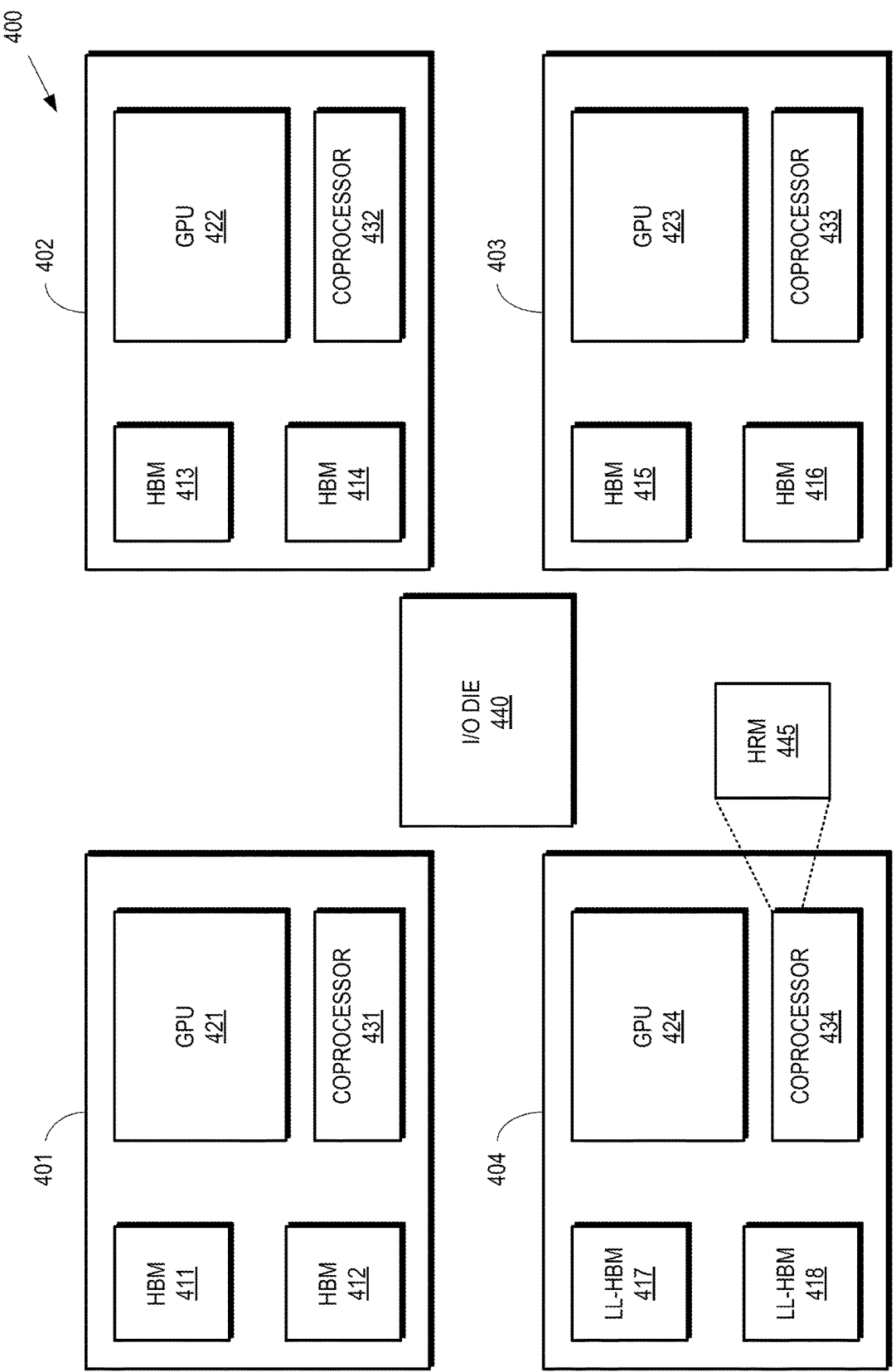
FIG. 4 is a block diagram of a GPU chiplet architecture that implements heterogeneous memory chips or memory stacks according to some embodiments.

FIG. 4 is a block diagram of a GPU chiplet architecture 400 that implements heterogeneous memory chips or memory stacks according to some embodiments. The GPU chiplet architecture 400 includes one or more GPU chiplets, such as the GPU chiplets 401, 402, 403, 404, which are collectively referred to herein as "the GPU chiplets 401-404." Although four GPU chiplets 401-404 are shown in FIG. 4, the number of GPU chiplets in the GPU chiplet architecture 400 is a matter of design choice and varies in other embodiments.

The GPU chiplets 401, 402, 404 include corresponding memory modules such as the HBM 411, 412, 413, 414, 415, 416, which are collectively referred to herein as "the HBM 411-418." In the illustrated embodiment, the HBM 411-416 operate with a first memory access latency. The GPU chiplet 403 includes low-latency memory module such as the LL-HBM 417, 418 that operate with a second memory access latency that is shorter than the first memory access latency. The GPU chiplets 401-404 also include corresponding GPUs 421, 422, 423, 424 (collectively referred to herein as "the GPUs 421-424") and coprocessors 431, 432, 433, 434 (collectively referred to herein as "the coprocessors 431-434"). An I/O die 440 coordinates providing information to the GPU chiplets 401-404, conveying information from the GPU chiplets 401-404 to other entities such as the CPU 140 shown in FIG. 1, and exchanging information between the GPU chiplets 401-404. In the interest of clarity, the numerous interconnections between the I/O die 440, the GPU chiplets 401-404, and external entities, are not shown in FIG. 4.

The coprocessor 434 executes an instance of an HRM 445, although some embodiments of the GPU chiplet 404 implement the HRM 445 as a separate module such as an ASIC, an FPGA, and the like. In some embodiments, other instances of the HRM are executed by the coprocessors 431-433 and the other instances coordinate operation with the HRM 445. The HRM 445 (in coordination with other instances of the HRM, if present) selectively schedules kernels or applications for execution on the chiplets 401-404 based on memory access characteristics of the applications and latencies of the memories implemented on the chiplets 401-404. In the illustrated embodiment, the HRM 445 (in coordination with other instances of the HRM, if present) schedules a kernel or an application to execute on the chiplet 404 including the LL-HBM 417, 418 in response to determining that the application has a relatively high cache miss rate, a relatively high row buffer miss rate, requires a relatively low-latency, exhibits irregular memory access requests, or a combination thereof. Otherwise, the HRM 445 (in coordination with other instances of the HRM, if present) schedules the kernel or application to execute on one of the chiplets 401-403. In some embodiments, the HRM 445 (in coordination with other instances of the HRM, if present) determines the memory access characteristics for the application based on hints included in the program code of the application. In some embodiments, the HRM 445 (in coordination with other instances of the HRM, if present) determines the memory access characteristics of the application by monitoring memory access requests to the HBM 411-416 or the LL-HBM 417, 418, as discussed herein.

As discussed herein, in some embodiments, applications are selectively scheduled for execution on GPUs associated with memories having relatively high or low latencies based on information included in the program code for the application. For example, programmers can annotate their code in ways that provide hints as to the memory access characteristics of a kernel. This approach can be complementary to an HRM that takes this information and allocates/schedules accordingly. In many cases, programmers have enough knowledge of the underlying intricacies of their algorithm to give the compiler and runtime a hint of where to properly schedule the algorithm. In some embodiments, the hint is provided with a language extension (e.g., pragma or qualifier) so that the compiler can annotate the kernel.

Below are examples of two HIP kernels. The first kernel includes information indicating a regular memory access behavior and the second kernel includes information indicating an irregular memory access:

_global_ void regular_kernel(int *a, int *b) { ... }
_low_latency_memory_
_global_ void irregular_kernel(int *x, int *y) { ... }

Similarly, data objects accessed by these irregular kernels could either be marked via a language extension, or the memory allocator could be modified to target a specific GPU's memory stack:

_low_latency_memory_ foo x;
bar*y=low_latency_malloc(sizeof(bar));

Including hints in the program code requires the programmer to make code changes and in some cases requires the programmer to have a deep understanding of the algorithms that are being executed.

In some embodiments, the kernel or application is scheduled using a dedicated hardware thread instead performing memory allocation in software at runtime. The hardware monitors profile statistics for kernels or applications executing on the GPU and then schedules the kernels or applications to the appropriate memories based on the profile statistics. This approach leads to a simplified software stack and potentially to better performance by reducing software overhead at the cost of additional hardware.

Off-line profile-guided scheduling uses an off-line profile of the kernels memory access behavior to schedule irregular kernels and allocate data to GPUs with low-latency memories. A profiler reads statistics associated with the running kernels. The statistics represent actions such as how often a kernel is causing cache and row buffer misses in memory. The profile results are fed into the runtime scheduling algorithm, which assigns kernels with specific characteristics to those GPU modules with lower latency memories. Memory allocation of the data associated with these kernels is guided via this profile and can be implemented in an HRM. Off-line profile-guided scheduling requires little or no programmer intervention and should not have a very high performance overhead during execution. However, this approach requires a profiling stage and decisions would be made based on a profiled input. Thus, actual inputs during execution could change the behavior of the algorithm and alter the memory access behavior.

Online dynamic scheduling enables the HRM to read performance counters and make dynamic scheduling decisions as applications are running. As kernels are executing, the HRM gathers statistics and keeps track of kernels that have previously shown memory characteristics such as high miss rates in row buffers or caches, which can indicate that the kernels are likely to see a performance benefit from scheduling on a low-latency memory. The allocation of memory is also adjusted based on the statistics. The kernels and memory objects could be dynamically migrated to the GPU(s) with low-latency memory. Online dynamic scheduling adapts to running application behavior but incurs higher overhead in the HRM scheduler due to the need to gather statistics to make decisions. In addition, there can be significant overhead with data movement if kernels and data are being migrated to different chiplets or memories.

Figure 5:
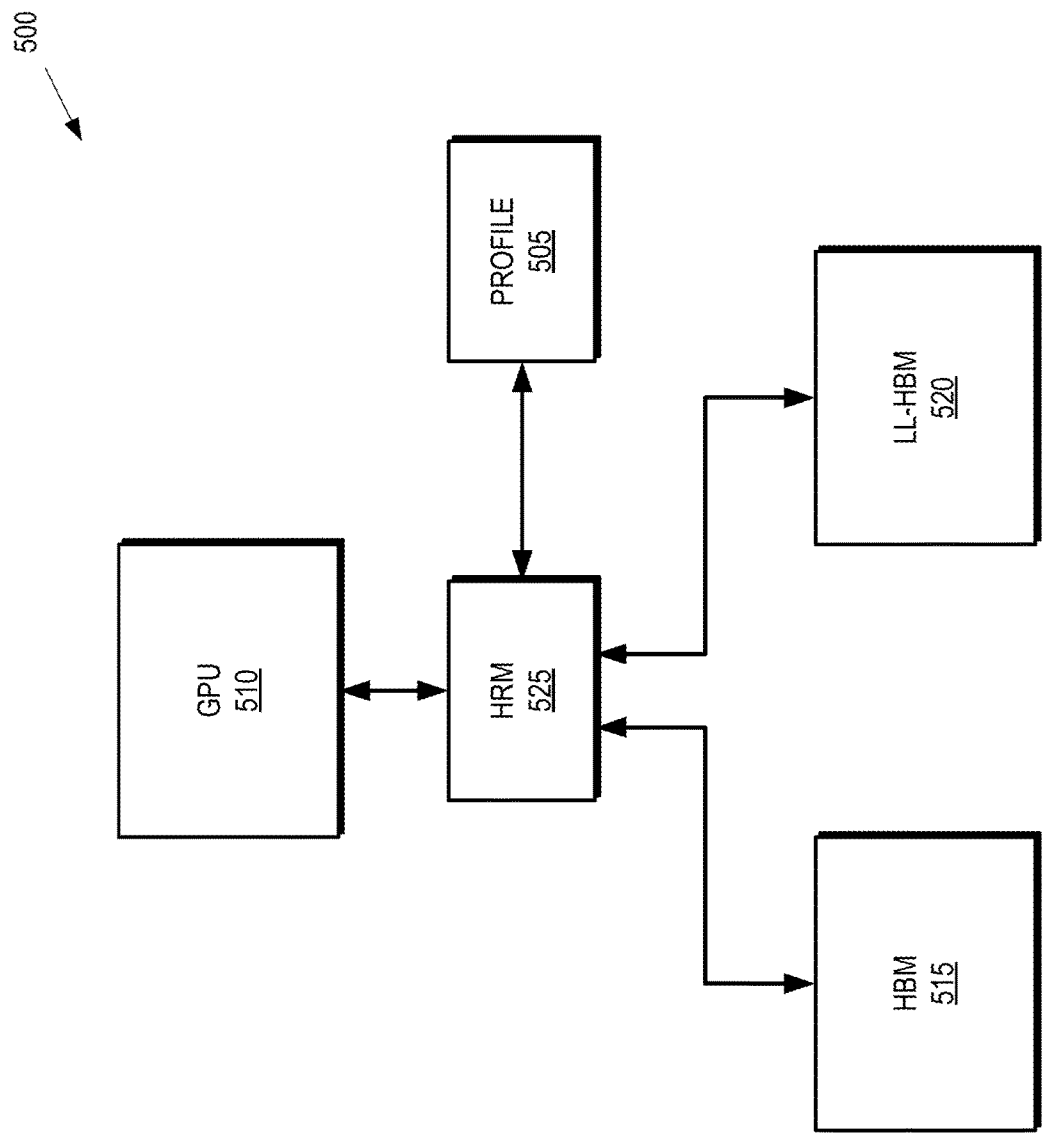
FIG. 5 is a block diagram of a processing system that performs online or off-line scheduling to memory modules having different latencies based on a profile according to some embodiments.

FIG. 5 is a block diagram of a processing system 500 that performs online or off-line scheduling to memory modules having different latencies based on a profile 505 according to some embodiments. The processing system 500 is used to implement some embodiments of the SOC 202 shown in FIG. 2 and the GPU chiplet architecture 400 shown in FIG. 4. In the illustrated embodiment, the processing system 500 includes a GPU 510, an HBM 515, and an LL-HBM 520 that has a latency lower than the latency of the HBM 515. The GPU 510 executes applications that are selectively scheduled to use the HBM 515 or the LL-HBM 520 by an HRM 525 based on memory access characteristics of the applications.

Information representing the memory access characteristics are stored in the profile 505. As discussed herein, the profile 505 can be an off-line profile that is populated prior to execution of the application (e.g., based on hints in the program code) or an online profile that is dynamically populated concurrently with execution of the application. In some embodiments, the information in the profile 505 represents a required memory access latency or a degree of irregularity of the memory access requests. For example, the HRM 525 can monitor miss rates or other buffer locality statistics for row buffers associated with the HBM 515 or the LL-HBM 520 to determine whether the memory access requests are relatively regular or irregular. Information representing the miss rates is stored in the profile 505 and the stored information is used to selectively schedule the applications to the HBM 515 (if row buffer miss rate is relatively low and the memory access requests are relatively regular) or the LL-HBM 520 (if the row buffer miss rate is relatively high and the memory access requests are relatively irregular).

Figure 6:
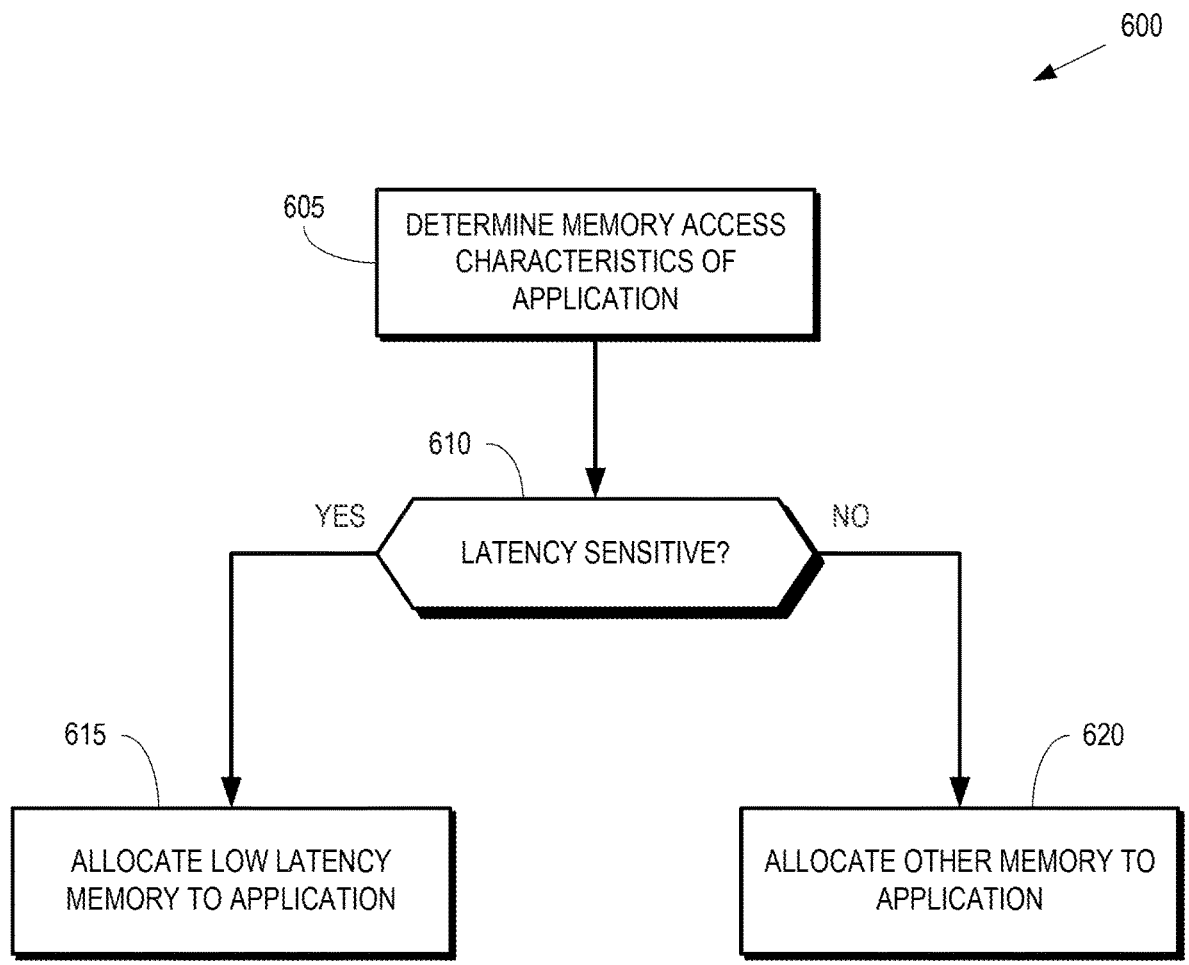
FIG. 6 is a flow diagram of a method of selectively allocating memory modules of different latencies based on memory access characteristics of an application according to some embodiments.

FIG. 6 is a flow diagram of a method 600 of selectively allocating memory modules of different latencies based on memory access characteristics of an application according to some embodiments. The method 600 is implemented in some embodiments of the SOC 202 shown in FIG. 2 and the GPU chiplet architecture 400 shown in FIG. 4.

At block 605, the memory access characteristics of an application are determined. In some embodiments, an HRM determines the memory access characteristics based on one or more of a hint included in program code, an off-line profile, or a dynamically created online profile, as discussed herein.

At decision block 610, the HRM determines whether the memory access characteristics indicate that the application is latency sensitive. For example, the HRM can determine whether the memory access requests are likely to receive a performance boost from being scheduled to low-latency memory. If so, the method 600 flows to the block 615. Otherwise, the method 600 flows to block 620.

At block 615, low-latency memory is allocated to the application. At block 620, memory other than the low-latency memory is allocated to the application.

In some embodiments, the apparatus and techniques described above are implemented in a system including one or more integrated circuit (IC) devices (also referred to as integrated circuit packages or microchips), such as the GPU architectures described above with reference to FIGS. 1-6. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code can include instructions, data, or a combination of instructions and data. The software instructions representing a design tool or fabrication tool typically are stored in a computer readable storage medium accessible to the computing system. Likewise, the code representative of one or more phases of the design or fabrication of an IC device is stored in and accessed from the same computer readable storage medium or a different computer readable storage medium.

A computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium are in source code, assembly language code, object code, or other instruction format that is interpreted or otherwise executable by one or more processors.

Note that not all of the activities or elements described above in the general description are required, that a portion of a specific activity or device is not required, and that one or more further activities are performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that can cause any benefit, advantage, or solution to occur or become more pronounced are not to be construed as a critical, required, or essential feature of any or all the claims. Moreover, the particular embodiments disclosed above are illustrative only, as the disclosed subject matter are modified and practiced in different but equivalent manners apparent to those skilled in the art having the benefit of the teachings herein. No limitations are intended to the details of construction or design herein shown, other than as described in the claims below. It is therefore evident that the particular embodiments disclosed above could be altered or modified and all such variations are considered within the scope of the disclosed subject matter. Accordingly, the protection sought herein is as set forth in the claims below.

What is claimed is:

1. An apparatus comprising:
   at least one processing unit; and
   a resource manager circuit configured to selectively allocate a first memory portion or a second memory portion to the at least one processing unit based on application level memory access characteristics, wherein the first memory portion has a first latency that is lower than a second latency of the second memory portion.

2. The apparatus of claim 1, wherein the application level memory access characteristics indicate a latency sensitivity of an application.

3. The apparatus of claim 1, wherein the resource manager circuit allocates the first memory portion in response to memory access requests associated with an application having a low degree of locality or irregular memory access patterns.

4. The apparatus of claim 3, wherein the resource manager circuit allocates the second memory portion in response to the memory access requests associated with the application having a relatively high degree of locality or regular memory access patterns compared to memory access requests allocated to the first memory portion.

5. The apparatus of claim 3, wherein the irregularity of memory access patterns of memory access requests is determined based on hints included in corresponding program code.

6. The apparatus of claim 1, wherein the resource manager circuit is configured to monitor memory access requests associated with an application and measure statistics for the memory access requests.

7. The apparatus of claim 6, wherein the statistics represent a cache miss rate or a row buffer miss rate for the monitored memory access requests.

8. The apparatus of claim 6, wherein the resource manager circuit is configured to allocate or reallocate the first memory portion or the second memory portion based on the statistics.

9. The apparatus of claim 1, further comprising:
at least one of a heterogeneous memory chip or a heterogeneous memory stack that comprises the first memory portion and the second memory portion.

10. The apparatus of claim 1, further comprising:
a plurality of chiplets comprising a plurality of processing units and a plurality of coprocessors configured to implement instances of the resource manager circuit, wherein a first subset of the chiplets comprises the first memory portion and a second subset of the chiplets comprises the second memory portion.

11. A method comprising:
selectively allocating a first memory portion or a second memory portion to at least one processing unit based on application level memory access characteristics, wherein the first memory portion has a first latency that is lower than a second latency of the second memory portion; and
executing, on the at least one processing unit, at least one of an application or a kernel using the allocated first or second memory portion.

12. The method of claim 11, wherein selectively allocating the first memory portion or the second memory portion comprises allocating the first memory portion in response to memory access requests associated with the application or the kernel having a low degree of locality or irregular memory access patterns.

13. The method of claim 12, wherein selectively allocating the first memory portion or the second memory portion comprises allocating the second memory portion in response to the memory access requests associated with the application or the kernel having a relatively high degree of locality or regular memory access patterns compared to memory access requests allocated to the first memory portion.

14. The method of claim 12, further comprising:
determining the irregularity of memory access patterns of memory access requests from the application or the kernel based on hints included in corresponding program code.

15. The method of claim 11, further comprising:
monitoring memory access requests associated with the application or the kernel; and
measuring statistics for the memory access requests.

16. The method of claim 15, wherein measuring the statistics comprises measuring a cache miss rate or a row buffer miss rate for the monitored memory access requests.

17. The method of claim 15, further comprising:
allocating or reallocating the first memory portion or the second memory portion based on the statistics.

18. A method comprising:
selectively allocating a first memory portion or a second memory portion to at least one processing unit based on an application level latency sensitivity of an application or a kernel, wherein the first memory portion has a first latency that is lower than a second latency of the second memory portion; and
executing, on at least one processing unit, at least one of the application or the kernel using the allocated first or second memory portion.

19. The method of claim 18, further comprising:
determining the application level latency sensitivity based on hints included in corresponding program code.

20. The method of claim 18, further comprising:
monitoring memory access requests associated with the application or the kernel;
measuring a cache miss rate or a row buffer miss rate for the monitored memory access requests; and
determining the application level latency sensitivity based on the cache miss rate or the row buffer miss rate.

\* \* \* \* \*

UNITED STATES PATENT AND TRADEMARK OFFICE
CERTIFICATE OF CORRECTION

| | | |
|---|---|---|
| PATENT NO. | : 12,067,642 B2 | Page 1 of 1 |
| APPLICATION NO. | : 17/030024 | |
| DATED | : August 20, 2024 | |
| INVENTOR(S) | : Niti Madan, Michael L. Chu and Ashwin Aji | |

It is certified that error appears in the above-identified patent and that said Letters Patent is hereby corrected as shown below:

In the Claims

Column 10 Line 53, Claim 5 please correct "wherein the irregularity of" to be --wherein an irregularity of--

Column 10 Line 63, Claim 7 please correct "monitored memory access requests." to be --memory access requests.--

Column 12 Line 2, Claim 14 please correct "determining the irregularity of" to be --determining an irregularity of--

Column 12 Line 12, Claim 16 please correct "monitored memory access requests." to be --memory access requests.--

Signed and Sealed this
Fourth Day of March, 2025

Coke Morgan Stewart
*Acting Director of the United States Patent and Trademark Office*